United States Patent
Peiker

(10) Patent No.: US 7,597,566 B2
(45) Date of Patent: Oct. 6, 2009

(54) APPARATUS FOR HOLDING A SIM CARD

(76) Inventor: Andreas Peiker, Max-Planck-Strasse 32, Friedrichsdorf (DE) 61381

( * ) Notice: Subject to any disclaimer, the term of this patent is extended or adjusted under 35 U.S.C. 154(b) by 0 days.

(21) Appl. No.: 12/333,582

(22) Filed: Dec. 12, 2008

(65) Prior Publication Data

US 2009/0117769 A1    May 7, 2009

Related U.S. Application Data

(63) Continuation of application No. PCT/DE2007/001079, filed on Jun. 19, 2007.

(30) Foreign Application Priority Data

Jul. 5, 2006    (DE) ........................ 10 2006 031 421
May 25, 2007    (DE) ........................ 10 2007 024 714

(51) Int. Cl.
     *H01R 13/44* (2006.01)
(52) U.S. Cl. ........................ 439/131; 439/136; 439/326
(58) Field of Classification Search ................. 439/131, 439/136, 326, 159, 630; 455/558, 575.1
See application file for complete search history.

(56) References Cited

U.S. PATENT DOCUMENTS 5,122,069 A * 6/1992 Brownlie et al. ............ 439/131
6,220,882 B1 * 4/2001 Simmel et al. .............. 439/326
6,942,502 B2 * 9/2005 Sharples ..................... 439/131
6,979,209 B2 * 12/2005 Griepentrog ................ 439/131
7,093,764 B1 * 8/2006 Valenzuela et al. .......... 439/326
2002/0192991 A1   12/2002 Motojima

FOREIGN PATENT DOCUMENTS

EP      0 768 613 A2    4/1997

* cited by examiner

Primary Examiner—Tho D Ta
(74) Attorney, Agent, or Firm—Burr & Brown

(57) ABSTRACT

The invention relates to a device for holding a SIM card with a SIM card reader, wherein the SIM card reader has a push-push mechanism by means of which the SIM card can be latched into a reading position and unlatched from the reading position into a removal position by repeatedly pressing the SIM card in a direction of insertion. In this arrangement, the SIM card reader is arranged on a rocker which is suspended to pivot between two end positions in a slot of a housing, wherein the SIM card reader is covered by a cover, wherein the cover closes off the slot in the first end position of the rocker and wherein the cover can be displaced against a restoring mechanism in the direction of insertion of the SIM card in the second end position of the rocker.

7 Claims, 7 Drawing Sheets

APPARATUS FOR HOLDING A SIM CARD

CROSS REFERENCE TO RELATED APPLICATIONS

This application is a continuation of International Application No. PCT/DE2007/001079, filed Jun. 19, 2007, which designated the United States, and claims the benefit under 35 USC §119(a)-(d) of German Application No. 10 2006 031 421.2 filed Jul. 5, 2006 and German Application No. 10 2007 024 714.3 filed May 25, 2007, the entireties of which are incorporated herein by reference.

FIELD OF THE INVENTION

The invention relates to a device for holding a SIM card with a SIM card reader that has a push-push mechanism.

BACKGROUND OF THE INVENTION

U.S. Patent Application Publication No. 2002/0192991 A1 discloses a card reader for installation in a housing of a device that has a so-called push-push mechanism by means of which the card can be latched into a reading position and unlatched from the reading position into a removal position by repeatedly pressing the card in a direction of insertion. Handling of the card is difficult in devices which comprise such card readers.

SUMMARY OF THE INVENTION

The invention is based on the object of developing a device for holding a SIM card which uses a push-push mechanism and in which, however, the SIM card can be arranged in the device so that it is completely covered from an environment of the device.

The device for holding a SIM card according to the invention provides for arranging the SIM card reader on a rocker, wherein the rocker is suspended in a slot in a housing so that it can pivot between two end positions, wherein the SIM card reader is faced by a cover, wherein the cover closes off the slot in a first end position of the rocker and wherein the cover can be displaced against a restoring mechanism in the direction of insertion of the SIM card when the rocker is in a second end position. This enables the SIM card to be comfortably manipulated in the direction of insertion in the second end position and to switch between the release position and the reading position since the cover which covers the SIM card reader and the SIM card can be moved together with the SIM card in the direction of insertion. As a result, it is not necessary that the SIM card projects under the cover for comfortable manipulation in the reading position and the cover can thus cover the slot gaplessly in its first end position when the SIM card is in the reading position. The core of the invention is thus a covering of the SIM card reader which can be displaced in parallel with the push-push mechanism of the SIM card reader.

Apart from a SIM card for a mobile telephone, a SIM card, in the context of the invention, is understood to mean any card-shaped information medium which can store information. This can be, for example, an electrical, optical or magnetic information medium. In particular, the term SIM card is also understood to cover memory cards such as, for example, SD cards and memory sticks. Card-shaped hard disks are also covered by the term SIM card in the context of the invention. A SIM card reader in the context of the invention is understood to be all card readers which are suitable for reading the aforementioned cards.

BRIEF DESCRIPTION OF THE DRAWINGS

Further details of the invention are described in the drawing by means of exemplary embodiments represented diagrammatically.

DETAILED DESCRIPTION OF THE INVENTION

Figure 1:
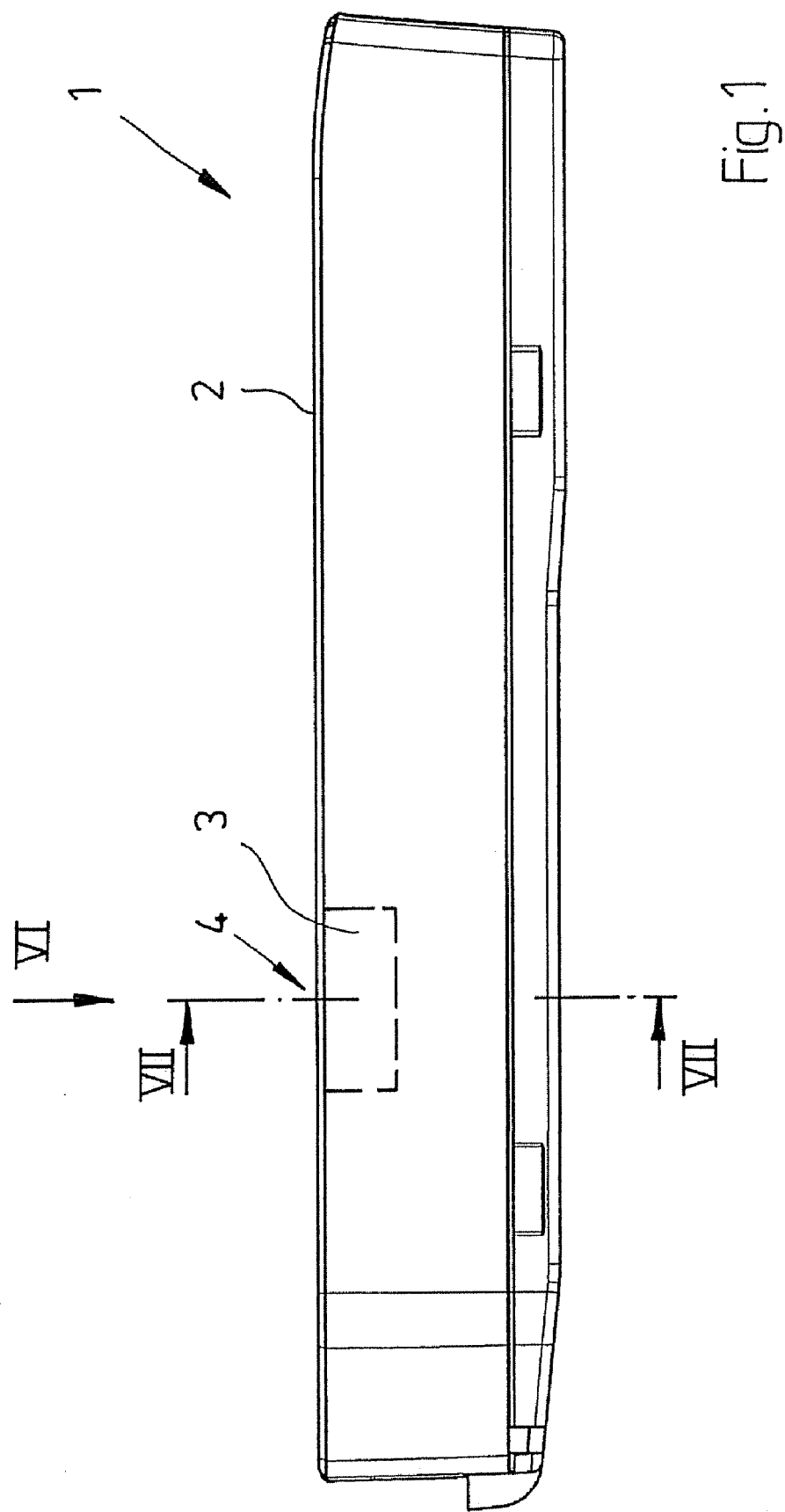
FIG. 1 shows a side view of a device according to the invention in which the rocker is in a first end position.

FIG. 1 shows a device 1 according to the invention in a side view. The device 1 is provided for being installed in a recess, not shown, of a center console or of a dashboard of a vehicle. Toward a top 2, the device 1 has a slot 3, indicated diagrammatically by dashed lines, which is closed by a cover 4.

Figure 2:
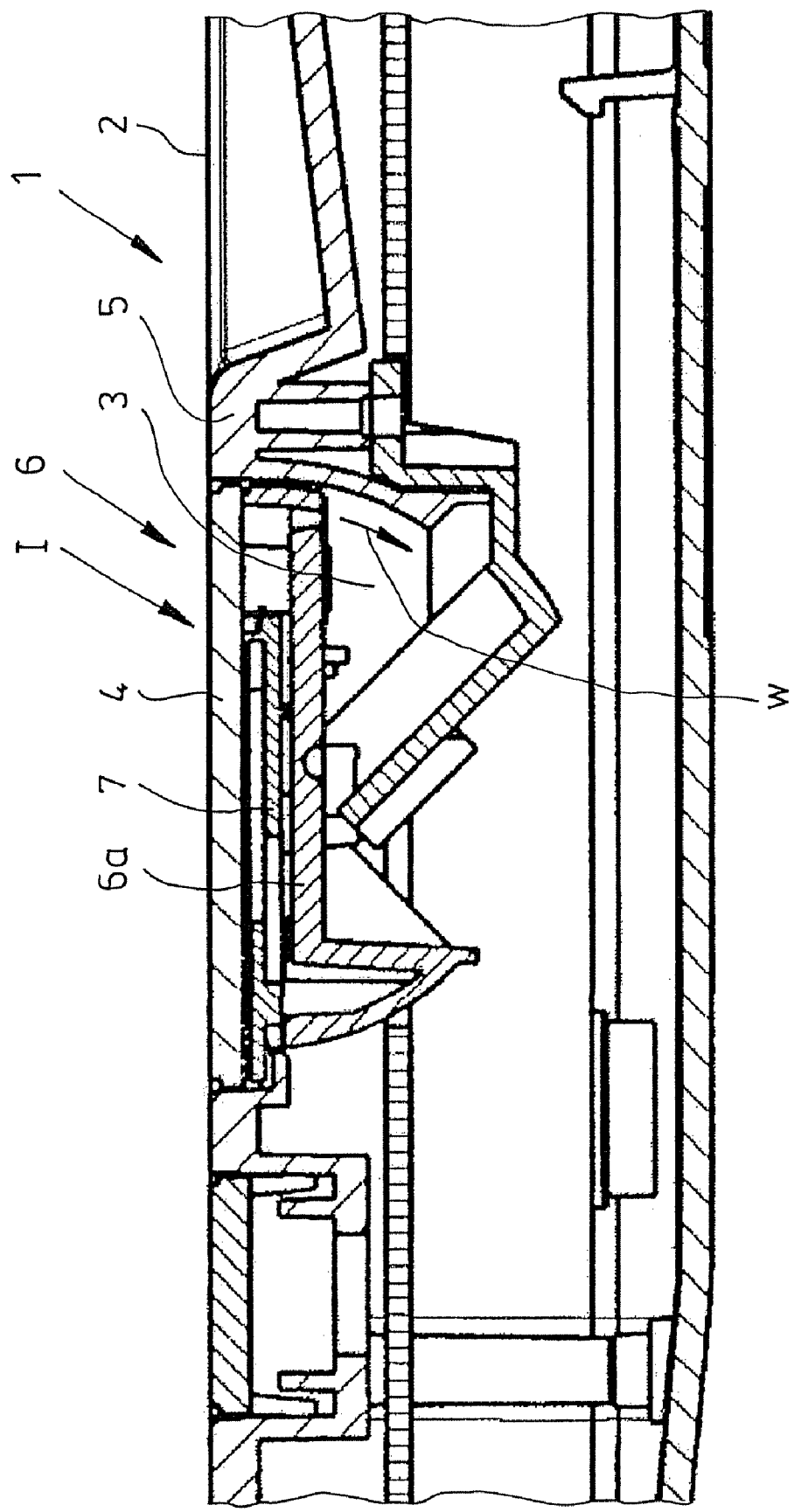
FIG. 2 shows a detailed cutaway view of the device shown in FIG. 1, in the area of the rocker.
Figure 3:
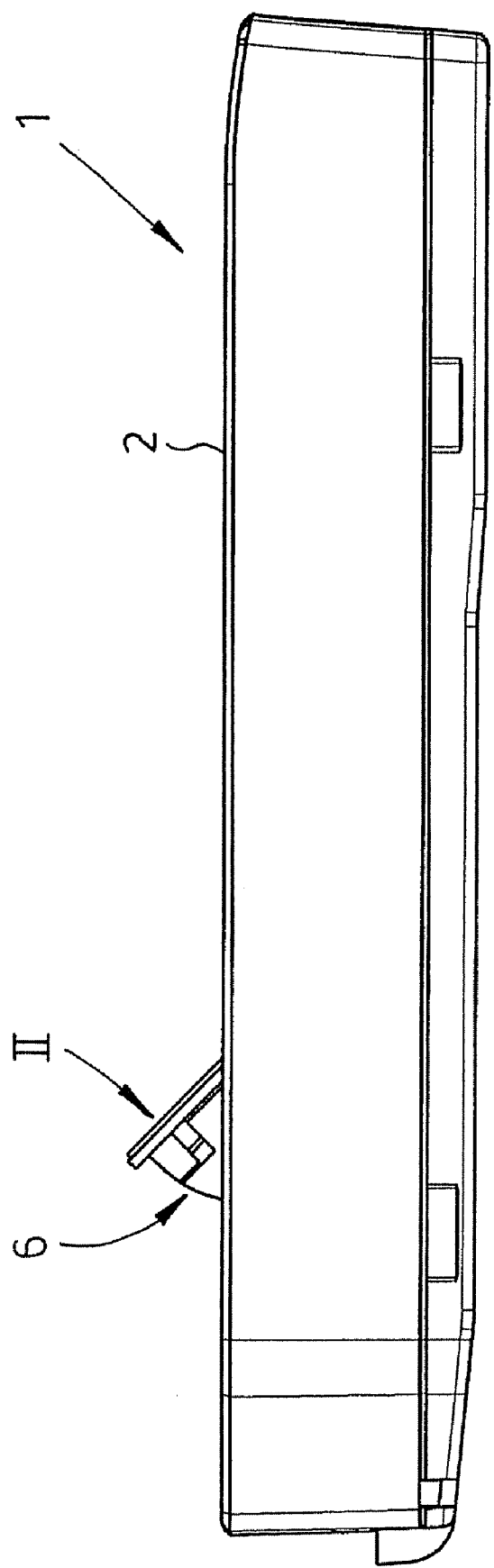
FIG. 3 shows a side view of the device shown in FIGS. 1 and 2 in which the rocker is in a second end position.

In FIG. 2, the device 1 shown in FIG. 1 is shown cutaway in the area of the cover 4. The device 1 essentially comprises a housing 5 and a rocker 6 which is supported to pivot in the housing 5. The rocker 6, in turn, comprises a carrier 6a, a SIM card reader 7 and the cover 4. In FIG. 2, the rocker 6 is horizontal in a first end position "I" in which the cover 4 of the rocker 6 closes off above the slot 3, the cover 4 lying flush in the top 2 of the device 1. The rocker 6 can be pivoted from the end position "I" shown in FIG. 2 into a direction of rotation w into a second end position "II" which is shown in FIG. 3. Analogously to FIG. 1, FIG. 3 again shows a side view of the device 1, wherein about half of the rocker 6 protrudes past the top 2 of the device 1.

Figure 4:
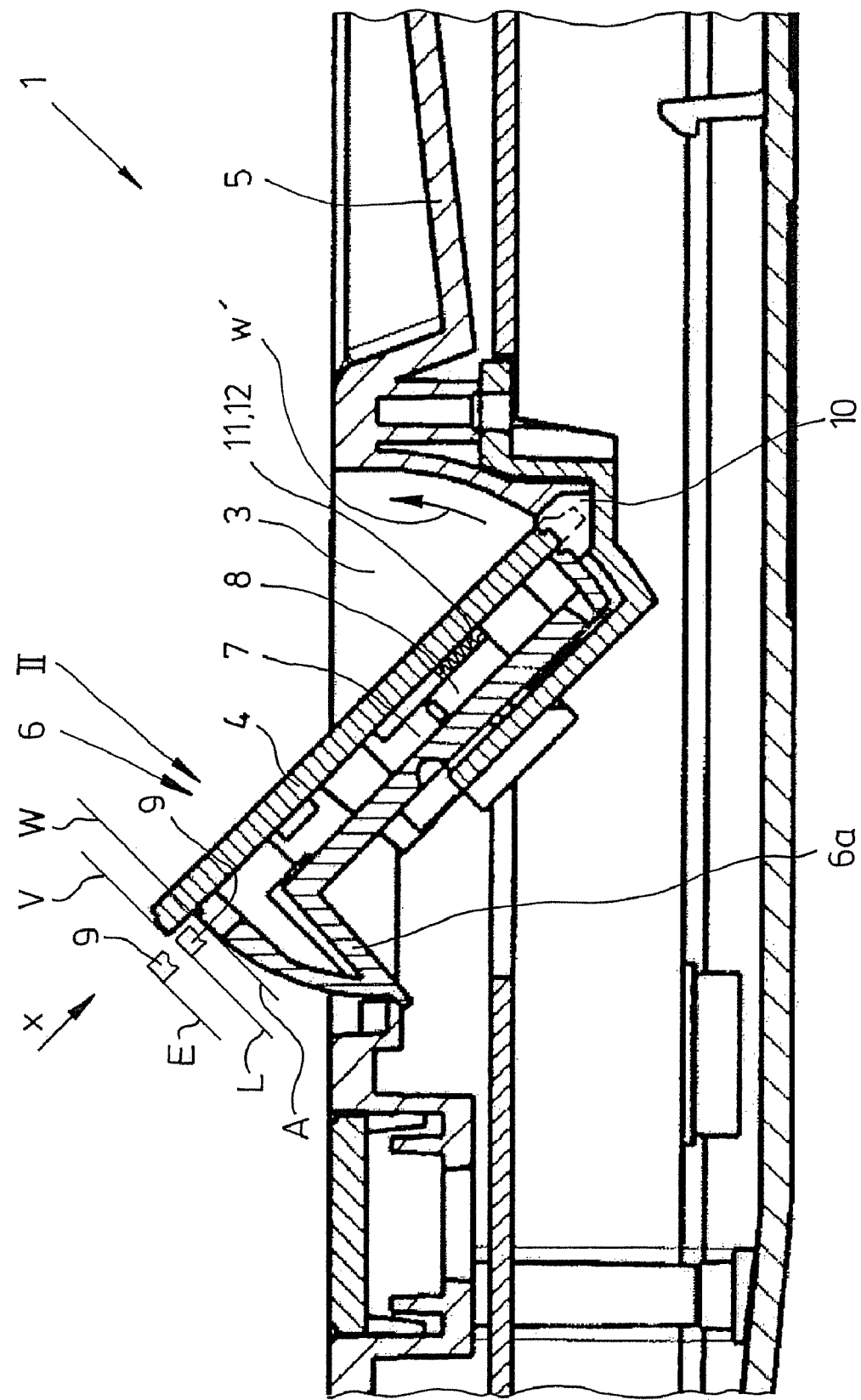
FIG. 4 shows a detail cutaway view of the device shown in FIG. 3, in the area of the rocker.

FIG. 4 shows a detailed view of the device 1 in the area of the rocker 6 in a sectional representation. The SIM card reader 7 comprises a so-called push-push mechanism 8 which permits a change between a reading position "L" of a SIM card 9 located in the SIM card reader 7 and a removal position "E" of the SIM card 9 located in the SIM card reader. This change between the reading position "L" and the removal position "E" of the SIM card 9 is possible by repeatedly pushing the SIM card 9 into a direction of insertion "x". During this process, the SIM card 9 is in each case pushed into the SIM card reader 7 in the direction of insertion "x" into a release position "A". To facilitate this pushing-in and to avoid injuries or damage to the fingernail, the cover 4, in the second end position "II" of the rocker 6, shown in FIG. 4, can also be pushed in the direction of insertion "x" from a position "V" shown into a position "W". The SIM card 9 and the cover 4 can thus be moved together into the release position "A". The displaceability of the cover 4 is made possible by a recess 10 which is formed in the slot 3 in which the rocker 6 is pivotably suspended. In the recess 10, the cover 4 is indicated with dashed lines in the position "W". The cover 4 is cushioned with respect to the SIM card reader 7 via a restoring mechanism 11, the restoring mechanism 11 essentially being formed by a spring 12. According to a variant of the embodiment not shown, it is also possible to arrange the restoring mechanism in the recess 10 at the housing. This simplifies the construction of the rocker. From the position "II", the rocker 6 can be restored into the first position shown in FIG. 2 by a rotation in a direction of the arrow "w'". However, this is only possible when the cover is restored to the position "V" by the action of restoring mechanism 11.

Figure 5:
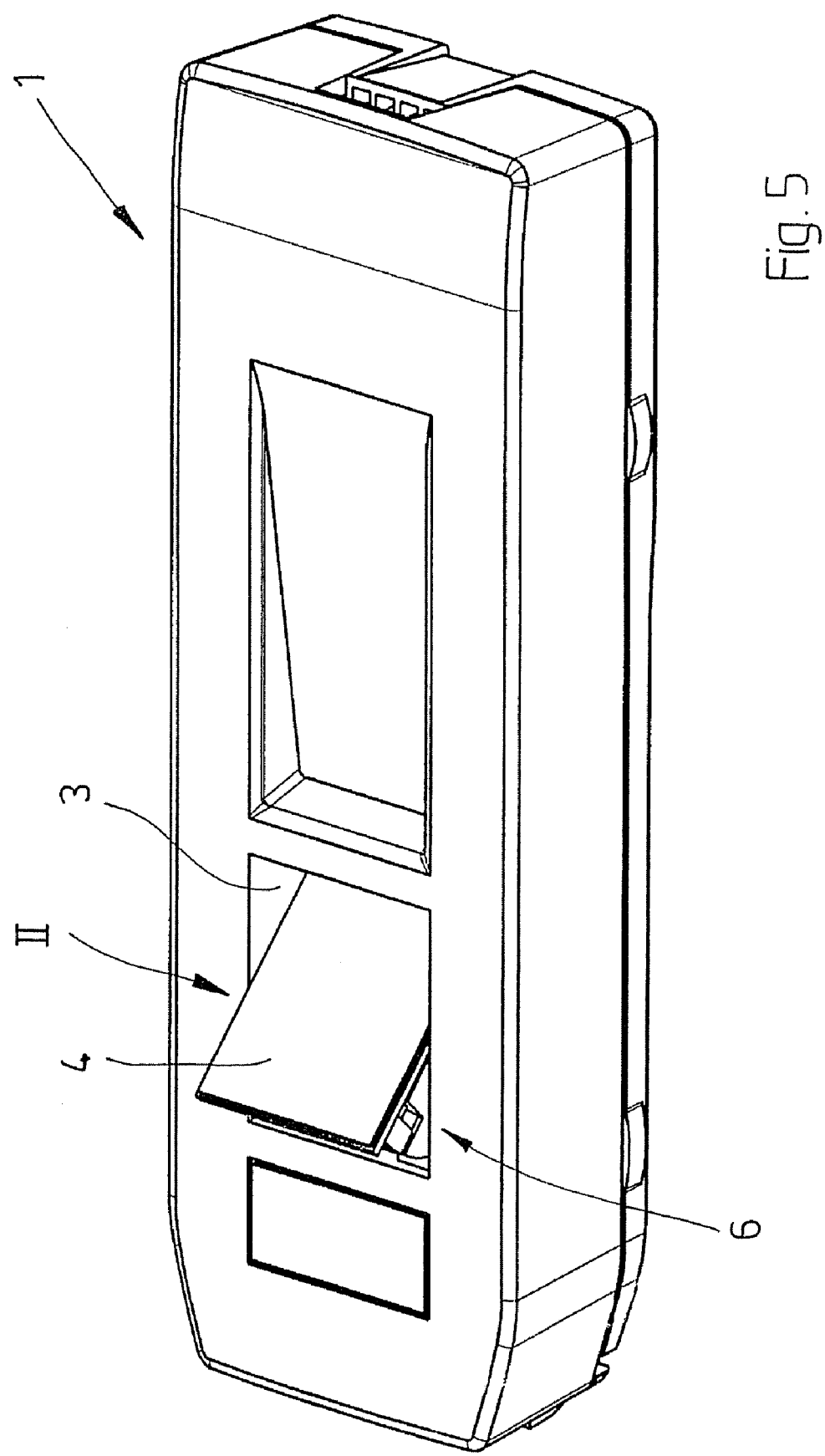
FIG. 5 shows a perspective view of the device in which the rocker is in the second end position.

In FIG. 5, the device 1 known from FIGS. 1 to 4 is also shown in a perspective view, wherein the rocker 6 is obliquely positioned in the slot 3 in the second end position II. In this second end position II, the SIM card, not shown here, can be pushed in and removed.

Figure 6:
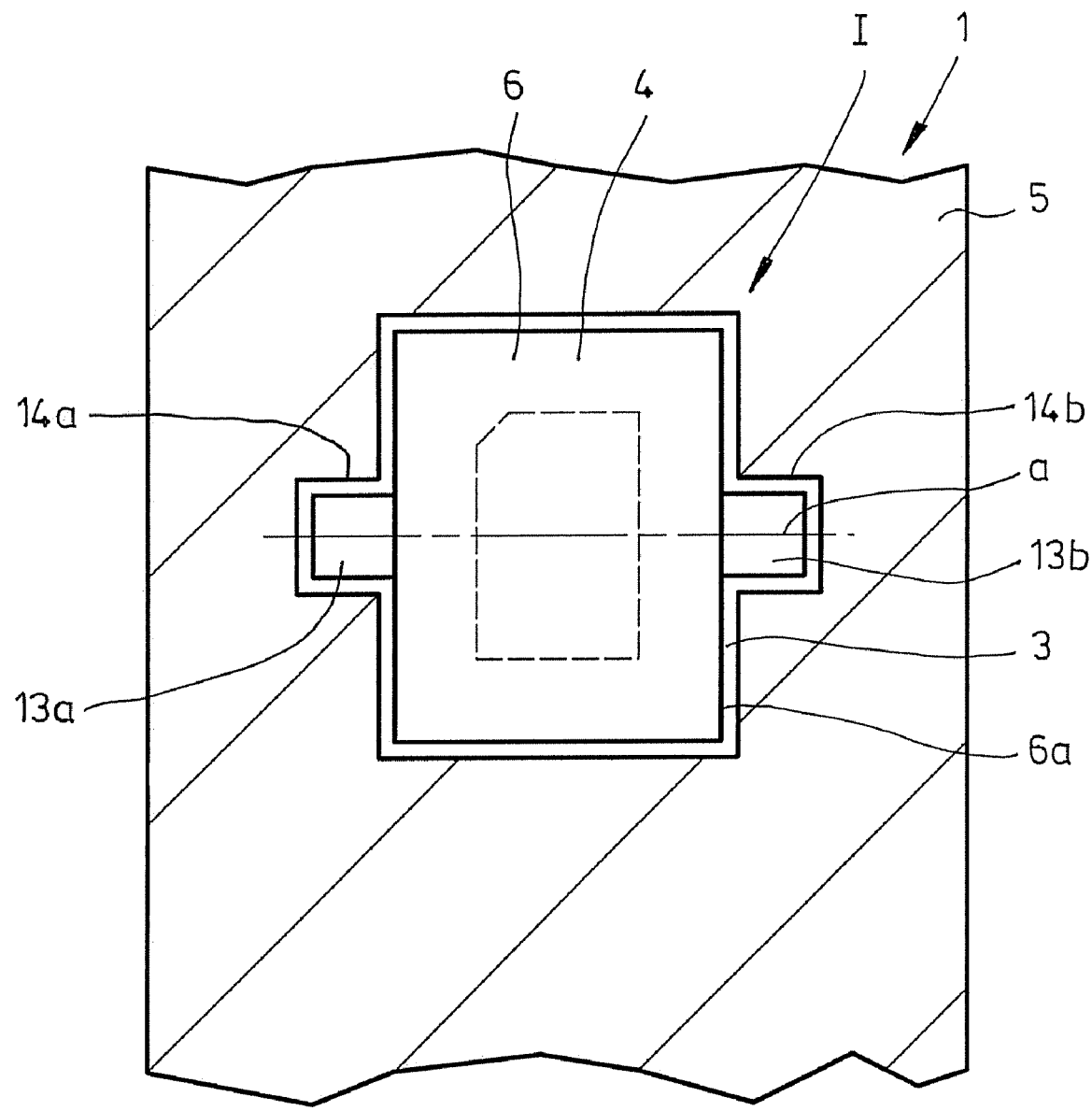
FIG. 6 shows a top view of the device in a direction VI shown in FIG. 1.

FIG. 6 shows a diagrammatic top view of the device 1 in a direction indicated by an arrow VI in FIG. 1. In the top view, the housing 5 and the cover 4 of the rocker 6 are visible. The rocker 6 is in the first end position I and closes off the slot 3. The rocker 6 is supported to pivot around a pivoting axis "a" in the housing 5. For this purpose, two mutually opposite studs 13a, 13b are arranged on the carrier 6a located below the cover 4. The studs 13a, 13b are supported in bearings 14a, 14b which are formed on the housing 5. Due to this rotational mounting of the rocker 6 at the housing 5, the rocker 6 can be pivoted over the slot 3 about the pivoting axis a into the second position shown, for example, in FIG. 3.

Figure 7:
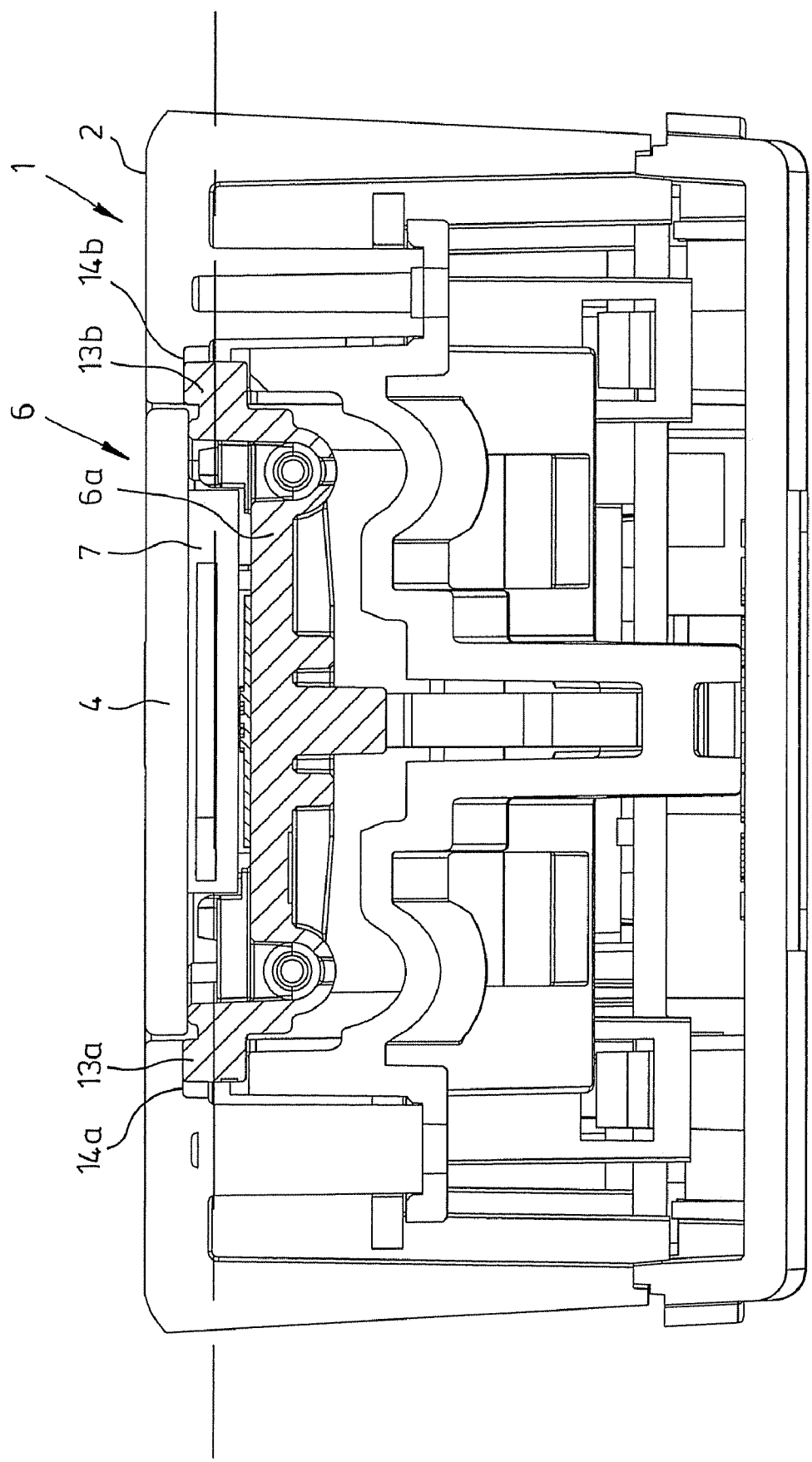
FIG. 7 shows a section through the device according to the section line VII-VII shown in FIG. 1.

In FIG. 7, a section through the device 1 is shown corresponding to the section line VII-VII shown in FIG. 1. In FIG. 7, only the carrier 6a is identified by shading. All other sectioned components are shown without shading in order to maintain the clarity of the representation. The studs 13a and 13b are molded directly onto the carrier 6a of the rocker 6. The carrier 6a carries the cover 4 of the rocker 6 and the SIM card reader 7 of the rocker 6 is accommodated between the carrier 6a and the cover 4. The bearings 14a and 14b for the studs 13a and 13b are formed on the housing 5 below its top 2.

The invention is not restricted to exemplary embodiments shown or described. Instead, it comprises developments of the invention as covered by the accompanying claims.

LIST OF REFERENCE DESIGNATIONS

1 Device
2 Top of 1
3 Slot
4 Cover
5 Housing
6 Rocker
6a Carrier
7 SIM card reader
8 Push-push mechanism
9 SIM card
10 Recess
11 Restoring mechanism
12 Spring
13a Stud on 6
13b Stud on 6
14a Bearing for 13a on 5
14b Bearing for 13b on 5
I First end position of 6
II Second end position of 6
a Pivoting axis of 6
w Direction of rotation of 6 from I to II
w' Direction of rotation of 6 from II to I
x Direction of insertion of 9
A Release position of 9
E Removal position of 9
L Reading position of 9
V First position of 4
W Second position of 4

I claim:

1. A device for holding a SIM card with a SIM card reader, wherein the SIM card reader has a push-push mechanism by means of which the SIM card can be latched into a reading position and unlatched from the reading position into a removal position by repeatedly pressing the SIM card in a direction of insertion, the device comprising a housing, a rocker for carrying the SIM card reader, the rocker being suspended to pivot between first and second end positions in a slot of the housing, and a cover for covering the SIM card reader, wherein the cover closes off the slot when the rocker is in the first end position and is displaceable against a restoring mechanism in a direction of insertion of the SIM card when the rocker is in the second end position.

2. The device as claimed in claim 1, wherein the restoring mechanism is arranged between the cover and the SIM card reader.

3. The device as claimed in claim 1, wherein the rocker includes a carrier, and the restoring mechanism is arranged between the cover and the carrier.

4. The device as claimed in claim 1, wherein the restoring mechanism is arranged between the cover and the housing.

5. The device as claimed in claim 4, wherein the restoring mechanism is arranged in a recess of the housing defined by the slot.

6. The device as claimed in claim 1, wherein the rocker is pivotable about a pivoting axis with respect to the housing.

7. The device as claimed in claim 1, wherein the rocker further comprises two studs that are supported in bearings provided in the housing.

* * * * *